United States Patent
Chao et al.

(10) Patent No.: US 9,631,320 B2
(45) Date of Patent: Apr. 25, 2017

(54) ANTI-FOAMING AGENT AND PULP PRODUCTION METHOD

(71) Applicants: Dow Corning Corporation, Midland, MI (US); DOW CORNING TORAY CO., LTD., Tokyo (JP)

(72) Inventors: Sung-Hsuen H. Chao, Seneffe (BE); Alain Hilberer, Recquignies (BE); Masakado Kennoki, Chiba (JP); Jianren Zeng, Chiba (JP)

(73) Assignees: Dow Corning Corporation, Midland, MI (US); Dow Corning Toray Co., Ltd., Tokyo (JP)

(*) Notice: Subject to any disclaimer, the term of this patent is extended or adjusted under 35 U.S.C. 154(b) by 0 days.

(21) Appl. No.: 14/424,103

(22) PCT Filed: Oct. 8, 2013

(86) PCT No.: PCT/US2013/063807
§ 371 (c)(1),
(2) Date: Feb. 26, 2015

(87) PCT Pub. No.: WO2014/058832
PCT Pub. Date: Apr. 17, 2014

(65) Prior Publication Data
US 2015/0240424 A1 Aug. 27, 2015

(30) Foreign Application Priority Data
Oct. 11, 2012 (JP) .................... 2012-225863

(51) Int. Cl.
| | | |
|---|---|---|
| *D21H 21/12* | (2006.01) | |
| *B01D 19/04* | (2006.01) | |
| *C08L 83/12* | (2006.01) | |
| *D21C 3/28* | (2006.01) | |
| *D21H 17/59* | (2006.01) | |
| *D21H 17/68* | (2006.01) | |
| *D21H 17/00* | (2006.01) | |
| *C08G 77/46* | (2006.01) | |

(52) U.S. Cl.
CPC ......... *D21H 21/12* (2013.01); *B01D 19/0409* (2013.01); *C08L 83/12* (2013.01); *D21C 3/28* (2013.01); *D21H 17/59* (2013.01); *D21H 17/68* (2013.01); *D21H 17/74* (2013.01); *C08G 77/46* (2013.01)

(58) Field of Classification Search
CPC ............ B01D 19/0409; B01D 19/0422; B01D 19/0454
See application file for complete search history.

(56) References Cited

U.S. PATENT DOCUMENTS

| | | | |
|---|---|---|---|
| 3,650,979 A * | 3/1972 | Hans-Horst et al. ............ | B01D 19/0409 516/121 |
| 4,436,647 A | 3/1984 | Pirson et al. | |
| 5,136,068 A * | 8/1992 | Bahr .................. | C08G 77/46 516/20 |
| 5,223,177 A * | 6/1993 | Topfl .................. | B01D 19/0404 516/118 |
| 5,376,301 A * | 12/1994 | Fleuren ............. | B01D 19/0409 510/278 |
| 5,387,417 A * | 2/1995 | Rentsch .............. | A61K 8/064 424/401 |
| 5,846,454 A | 12/1998 | Koczo et al. | |
| 5,990,181 A * | 11/1999 | Spyropoulos ...... | B01D 19/0404 510/466 |
| 6,512,015 B1 * | 1/2003 | Elms ................. | B01D 19/0404 516/117 |
| 7,105,581 B2 * | 9/2006 | Burger .................. | D21H 21/12 516/124 |
| 7,678,835 B2 * | 3/2010 | Koczo ................ | B01D 19/0404 516/118 |
| 2011/0294714 A1 | 12/2011 | Delbrassinne et al. | |

FOREIGN PATENT DOCUMENTS

| | | | |
|---|---|---|---|
| EP | 254499 A2 * | 1/1988 | |
| EP | 769548 A1 * | 9/1996 | |
| EP | 1167502 | 4/2004 | |
| JP | 9-202893 | * | 8/1997 |
| JP | 2001-20191 | 1/2001 | |

OTHER PUBLICATIONS

Machine translation for JP 9-202893 (no date).*
Product data sheet for Sipernat D17.*
Translation of First Office Action for Chinese PCT counterpart application No. 201380051374.X, Oct. 19, 2015.

* cited by examiner

*Primary Examiner* — Marc Zimmer

(74) *Attorney, Agent, or Firm* — Warner Norcross & Judd LLP

(57) ABSTRACT

An anti-foaming agent containing (A) an organopolysiloxane and a finely powdered inorganic filler, (B) a polyoxyalkylene group-containing branched chain organopolysiloxane, and (C) an anionic surfactant. This anti-foaming agent exhibits stable anti-foaming performance even at high temperatures that reach, for example, 80QC or under strongly alkaline conditions and produces no aggregates.

15 Claims, No Drawings

ANTI-FOAMING AGENT AND PULP PRODUCTION METHOD

This application is a national stage entry of International Patent Application No. PCT/US2013/063807, filed Oct. 8, 2013, which claims priority to and all the advantages of Japanese Patent Application No. 2012-225863, filed Oct. 11, 2012, the content of each of which are incorporated herein by reference in their entirety.

TECHNICAL FIELD

The present invention relates to an anti-foaming agent that can be used particularly advantageously in a pulp production process and to a pulp production method using said anti-foaming agent.

BACKGROUND

Pulps are fibrous components that are mechanically or chemically extracted from plant tissues such as wood, and are classified into mechanical pulps which are produced by mechanical methods, chemical pulps which are produced by chemical methods, and semi-chemical pulps which are produced by a combination of these methods. In addition, chemical pulps are broadly classified into sulfite pulps and Kraft pulps depending on the chemicals used, with Kraft pulps accounting for the majority of chemical pulp produced.

Kraft pulp production processes generally comprise a digestion step, a washing step, a bleaching step and a processing step. In the digestion step, a wood chip raw material is subjected to pressurized steaming in a mixture of sodium hydroxide and sodium sulfide, thereby solubilizing non-fibrous components in the raw material, such as lignins, resins and organic acids. The steamed pulp obtained in the digestion step is sent to the washing step through a blow tank.

In the washing step, the non-fibrous components solubilized in the digestion step and residual digestion chemicals are removed from the pulp by washing/dewatering. The digestion liquor and washing effluent removed in the washing step are generally referred to as black liquor. The most common washers used in washing steps are vacuum drum washers, and it is common to use a multi-stage (counterflow rotating) washing apparatus in which 2 to 3 of these vacuum drum washers are connected in series.

Washing is ideally carried out while completely replacing the black liquor with pure water, but by doing so, a large quantity of effluent having a low concentration of black liquor is recovered and this effluent is concentrated through evaporation by means of an evaporator, thereby increasing costs. Therefore, it is necessary to reduce the quantity of pure water used as far as possible and recover an effluent having a high concentration of black liquor. For example, in the case of a three-stage washing apparatus, it is common for the black liquor recovered in the second stage drum washer to be used in the washing liquid (washer shower) in the first stage, for the black liquor recovered in the third stage drum washer to be used in the washer shower in the second stage, and for pure water to be used only in the washer shower in the third stage in order to increase washing efficiency.

Black liquor contains surface active substances such as lignins and sodium salts of resin components, and therefore causes foaming. Such foaming readily occurs during the washing step, and especially in vacuum drum washer vats and black liquor recovery tanks. As a result of the foaming, the pulp dewatering rate is reduced, the quality of the pulp per se deteriorates, and blocks of pulp sink as sheets rather than building up in the vacuum drum, which can cause a shutdown of operations.

In addition, black liquor is generally a high temperature strongly alkaline liquid having a temperature of 60 to 80° C. and a pH of 12 or higher, meaning that in cases where the black liquor overflows from the tank due to excessive foaming, safety problems can occur. The pulp (unbleached pulp) obtained in the above-mentioned washing step is then sent to the bleaching step.

In the bleaching step, the pulp is bleached by decoloring or removing colored components (mainly, lignins and pigment type substances) in the pulp, and the pulp may be imparted with physical and chemical characteristic suitable for the intended use of the pulp. A chemical such as sodium hypochlorite is used for the bleaching. In this bleaching step, the pH of the pulp is reduced, but resin components that adhered to the pulp during the strongly alkaline washing step are dissolved in the bleaching liquor and reduce the surface tension of the liquor, thereby causing vigorous foaming. This foaming causes a variety of problems, such as a reduction in the bleaching effect, a reduction in circulation speed, suspension or outflow of the bleaching raw material, and the like.

In the processing step, basic characteristics are imparted to a paper by beating, sizing, coloring (toning), and filling. Specifically, pulp fibers dispersed in water are repeatedly subjected to compression and restoration, or a sizing agent, a loading material, a coloring agent, and/or other chemicals are added to the pulp fibers.

A proposal has been made to use a silicone-based anti-foaming agent in order to suppress foaming in a pulp production process such as that described above. For example, Japanese Unexamined Patent Application Publication No. 2001-20191 discloses an anti-foaming agent that contains a polyoxyalkylene-modified silicone oil, a non-ionic surfactant other than the polyoxyalkylene-modified silicone oil, and a thickening agent comprising a water-soluble polymer in a silicone-based anti-foaming agent obtained by adding a finely powdered silica to a silicone oil.

However, because this type of non-ionic surfactant-containing silicone-based anti-foaming agent suffers from low anti-foaming agent dispersion stability in harsh environments such as high temperatures or strongly alkaline conditions, the anti-foaming agent per se forms "aggregates" (also known as "pitch" or "deposits")) and the deposition of other organic substances in the black liquor, which are produced in the pulp production process, progresses, meaning that aggregates tend to become larger and more numerous.

SUMMARY OF INVENTION

An object of the present invention is to provide an anti-foaming agent which exhibits stable anti-foaming performance even in harsh environments such as high temperatures or strongly alkaline conditions and preferably which does not produce aggregates derived from the anti-foaming agent and the like.

By taking into account problems such as those mentioned above and as a result of diligent research into superior silicone-based anti-foaming agents that can be used particularly advantageously in pulp production processes, the inventors of the present invention found that by combining an organopolysiloxane and a finely powdered inorganic filler, a polyoxyalkylene group-containing branched chain organopolysiloxane, and an anionic surfactant, it was possible to suppress the generation of undesirable aggregates even in harsh environments such as high temperatures or strongly alkaline conditions.

In one embodiment the present invention is achieved with an anti-foaming agent that contains (A) an organopolysiloxane and a finely powdered inorganic filler, (B) a polyoxyalkylene group-containing branched chain organopolysiloxane, and (C) an anionic surfactant.

The aforementioned finely powdered inorganic filler is preferably one selected from microparticulate silica, titanium dioxide, aluminum oxide, fumed $TiO_2$, $Al_2O_3$, zinc oxide, magnesium oxide, and mixtures thereof.

The blending quantity of the aforementioned (A) organopolysiloxane and finely powdered inorganic filler is preferably from 5 to 90 wt. % relative to the total weight of the anti-foaming agent of the present invention.

The blending quantity of the aforementioned (B) polyoxyalkylene group-containing branched chain organopolysiloxane is preferably from 1 to 40 wt. % relative to the total weight of the anti-foaming agent of the present invention.

The aforementioned (C) anionic surfactant is preferably a sulfonate type anionic surfactant selected from the group consisting of α-sulfo fatty acid alkyl ester salts, α-olefin sulfonate salts, alkane sulfonic acid salts, straight chain alkylbenzene sulfonate salts, and mixtures thereof.

The aforementioned sulfonate salts are preferably selected from sodium salts, potassium salts, lithium salts, ammonium salts, and mixtures thereof.

The blending quantity of the aforementioned (C) anionic surfactant is preferably from 1 to 30 wt. % relative to the total weight of the anti-foaming agent of the present invention.

It is preferable for the anti-foaming agent of the present invention to further contain (D) a non-ionic surfactant (excluding component (B)).

The blending quantity of the aforementioned (D) non-ionic surfactant (excluding component (B)) is preferably from 0.01 to 25 wt. % relative to the total weight of the anti-foaming agent of the present invention.

It is preferable for the anti-foaming agent of the present invention to further contain a water-soluble polymer.

It is preferable for the anti-foaming agent of the present invention to further contain water and be in the form of an emulsion.

The anti-foaming agent of the present invention is suitable for use in pulp production.

The present invention also relates to a pulp production method including adding the aforementioned anti-foaming agent to water for pulp production.

In the aforementioned pulp production method, the anti-foaming agent of the present invention is preferably added at a total concentration of from 1 to 500 g/ton relative to the weight of absolutely dry pulp.

It is preferable for the aforementioned anti-foaming agent to be added to the water for pulp production in the washing step and/or the bleaching step.

The anti-foaming agent of the present invention exhibits stable anti-foaming performance even in harsh environments such as high temperatures or strongly alkaline conditions in, for example, pulp production processes and can suppress the generation of undesirable aggregates.

The pulp production method of the present invention can suppress foaming in the pulp production process, such as in the washing step and/or the bleaching step, and can therefore produce a high quality pulp with good efficiency.

DETAILED DESCRIPTION OF THE INVENTION

The anti-foaming agent of the present invention comprises
(A) an organopolysiloxane and a finely powdered inorganic filler,
(B) a polyoxyalkylene group-containing branched chain organopolysiloxane, and
(C) an anionic surfactant.

The organopolysiloxane of component (A) is not particularly limited, and it is possible to use one or two or more types of organopolysiloxane. Examples of the aforementioned organopolysiloxane include organopolysiloxanes comprising structural units represented by the following formula (X):

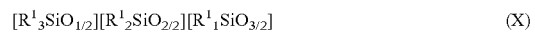

$$[R^1_3SiO_{1/2}][R^1_2SiO_{2/2}][R^1_1SiO_{3/2}] \qquad (X)$$

Examples of $R^1$ in the structural units in formula (X) above include alkyl groups such as methyl groups, ethyl groups, propyl groups, butyl groups, pentyl groups, hexyl groups, heptyl groups, octyl groups, nonyl groups, decyl groups, dodecyl groups, tetradecyl groups, hexadecyl groups, and octadecyl groups; cycloalkyl groups such as cyclohexyl groups; alkenyl groups such as vinyl groups and allyl groups; aryl groups such as phenyl groups and tolyl groups; alkylaryl groups such as 2-phenylpropyl; and substituted or unsubstituted monovalent hydrocarbon groups (organic groups) having from 1 to 20 carbons, such as chloromethyl groups, 3-chloropropyl groups, 3,3,3-trifluoropropyl groups, and cyanoethyl groups, which are obtained by substituting some or all of the hydrogen atoms bonded to the carbon atoms in the above-mentioned groups with halogen atoms and/or cyano groups. The $R^1$ moieties may be the same or different in each unit, but it is preferable for 90 mol. % or more of the $R^1$ moieties to be methyl groups.

The proportions of the structural units in formula (X) above are such that $[R^1_3SiO_{1/2}]:[R^1_2SiO_{2/2}]:[R^1_1SiO_{3/2}]$ is preferably 0.1-5:90-99.8:0.1-5 (mol. %), and more preferably 1-3:94-98:1-3 (mol. %).

A proportion of $[R^1_3SiO_{1/2}]$ of less than 0.1 mol. % is not preferable due to concerns that the viscosity of the anti-foaming agent increases and it can be difficult to handle the anti-foaming agent, and a proportion of $[R^1_3SiO_{1/2}]$ in excess of 5 mol. % is not preferable due to concerns that the viscosity of the anti-foaming agent decreases and the anti-foaming properties may deteriorate. In addition, a proportion of $[R^1_2SiO_{2/2}]$ of less than 90 mol. % is not preferable due to concerns that the viscosity of the anti-foaming agent decreases and the anti-foaming properties may deteriorate, and a proportion of $[R^1_2SiO_{2/2}]$ in excess of 99.8 mol. % is not preferable due to concerns that the viscosity of the anti-foaming agent increases and it can be difficult to handle the anti-foaming agent. Furthermore, a proportion of $[R^1_1SiO_{3/2}]$ of less than 0.1 mol. % is not preferable due to concerns that the viscosity of the anti-foaming agent decreases and the anti-foaming properties may deteriorate, and a proportion of $[R^1_1SiO_{3/2}]$ in excess of 5 mol. % is not preferable due to concerns that the viscosity of the anti-foaming agent increases and it can be difficult to handle the anti-foaming agent.

The aforementioned organopolysiloxane preferably has a low viscosity from the perspectives of dispersibility and operability, and preferably has a high viscosity from the perspective of anti-foaming properties. Therefore, the aforementioned organopolysiloxane has a viscosity, as measured at 25° C. using a B type rotational viscometer, of from 100 to 1,000,000 centipoise (cP), and preferably from 1,000 to 100,000 cP. A viscosity of less than 100 cP is not preferable due to concerns that the anti-foaming properties of the anti-foaming agent may deteriorate, and a viscosity in excess of 1,000,000 cP is not preferable due to concerns that it can be difficult to prepare an emulsion of the anti-foaming agent.

The aforementioned organopolysiloxane can be produced using a method known in the art. For example, the organopolysiloxane can be produced by subjecting organopolysiloxanes having different structures to a condensation reaction (see Japanese Unexamined Patent Application Publication Nos. S60-251906 and S63-147507) or by subjecting an organopolysiloxane to a partial hydrosilylation with an organic compound having an unsaturated group (see Japanese Unexamined Patent Application Publication Nos. H05-184814 and S61-197007).

The finely powdered inorganic filler of component (A) is well known and is not particularly limited as long as the powder is a finely pulverized microparticulate substance, but examples thereof include silica, titanium dioxide, aluminum oxide, fumed $TiO_2$, $Al_2O_3$, zinc oxide, magnesium oxide, and mixtures thereof. One or two or more types of finely powdered inorganic filler may be used.

A more suitable finely powdered inorganic filler is finely powdered silica, with finely powdered silica having a BET specific surface area of at least 50 $m^2/g$ being preferred. The finely powdered silica can be produced using a publicly known method, such as a silicon halide pyrolysis method, a method involving decomposition and precipitation of a metal silicate such as sodium silicate, or a gel formation method. Types of silica preferred for use in the anti-foaming agent of the present invention include fumed silica, precipitated silica, and gel-forming silica. The average particle dimensions of these fillers are generally from 0.1 to 50 μm, and preferably from 1 to 30 μm, but are not limited to this, and a person skilled in the art can determine the optimal average particle diameter as appropriate using a method known in the art.

In cases where the surface of the finely powdered inorganic filler is not hydrophobic, the surface may be hydrophobized in order to make the anti-foaming agent effective in aqueous systems. The hydrophobization can be achieved by treating filler particles with a treatment agent such as a reactive silane or siloxane, such as dimethyldichlorosilane, trimethylchlorosilane, hexamethyldisilazane, hydroxyl-capped and methyl-capped polydimethylsiloxanes, siloxane resins, and mixtures thereof. The hydrophobization can be achieved by adding appropriate quantities of the above-mentioned treatment agents to the liquid organopolysiloxane, before, during, and after dispersing the finely powdered inorganic filler in the liquid organopolysiloxane, and then heating the obtained mixture to a temperature of, for example, 40° C. or higher. Moreover, fillers hydrophobized using treatment agents such as those mentioned above are commercially available, examples which include Sipernat® D10 produced by Evonik. The quantity of the treatment agent used may depend on, for example, the type of treatment agent and finely powdered inorganic filler used.

The blending proportions of the aforementioned organopolysiloxane and finely powdered inorganic filler may be 80-99.9:0.1-20 (wt. %), and preferably 90-99:1-10 (wt. %). A blending proportion of the finely powdered inorganic filler of less than 0.1 wt. % is not preferable due to concerns that the anti-foaming properties of the anti-foaming agent may deteriorate, and a blending proportion of the finely powdered inorganic filler in excess of 20 wt. % is not preferable due to concerns that the viscosity of the anti-foaming agent increases and it can be difficult to handle the anti-foaming agent.

Component (A) can be produced by, for example, heat treating the organopolysiloxane and the finely powdered inorganic filler at the proportions mentioned above at a temperature of, for example, from 60 to 200° C. while stirring in a mixer having a stirring mechanism and, if necessary, removing low boiling point fractions. A specific method for producing component (A) is not particularly limited, but component (A), which comprises an organopolysiloxane and silica, can be produced by using, for example, the method disclosed in Japanese Examined Patent Application Publication No. S27-2263.

Component (A) is preferably a low viscosity liquid from the perspectives of dispersibility and workability of the anti-foaming agent of the present invention in harsh environments such as high temperatures or strongly alkaline conditions, and is preferably a highly viscous material from the perspective of anti-foaming properties. Therefore, the viscosity at 25° C., as measured using a B type rotational viscometer (no. 4 rotor, 6 rpm), is preferably from 100 to 1,000,000 mPa·s, and more preferably from 1,000 to 100,000 mPa·s. If the viscosity is less than 100 mPa·s, component (A) separates in the anti-foaming agent and may become unstable, and if the viscosity exceeds 1,000,000 mPa·s, it can be difficult to produce the anti-foaming agent in the form of an emulsion.

Component (A) is preferably contained at a quantity of from 5 to 90 wt. %, more preferably from 7 to 80 wt. %, further preferably from 9 to 70 wt. %, even more preferably from 10 to 60 wt. %, and particularly preferably from 12 to 55 wt. %, relative to the total weight of the anti-foaming agent, but the maximum content thereof may be 55, 50, 45, 40, 35, 30, or 25 wt. %.

Component (B) acts as an emulsifier used to reduce the viscosity of the above-mentioned component (A) and improve workability when emulsifying and dispersing in an aqueous system (an aqueous dispersion) and, together with component (C) described below, exhibits the effect of suppressing the generation of undesirable aggregates in harsh environments such as high temperatures or strongly alkaline conditions that occur in, for example, pulp production processes.

Component (B) is an organopolysiloxane which has at least one polyoxyalkylene group and has a branched structure in the molecular structure.

The polyoxyalkylene group in component (B) is not particularly limited, but is preferably an oxyalkylene group represented by the formula $-R^3-O(C_2H_4O)_p(C_3H_6O)_q-R^4$ (wherein, $R^3$ is a divalent hydrocarbon group having from 1 to 4 carbons, $R^4$ is a hydrogen atom, an alkyl group having from 1 to 6 carbons, an acyl group, or an isocyano group, and p and q are integers that satisfy such that $10 \leq p+q \leq 100$ and $10:90 \leq p:q \leq 100:0$).

Examples of the divalent hydrocarbon group having from 1 to 4 carbons represented by $R^3$ include methylene groups, ethylene groups, propylene groups and butylene groups, examples of the alkyl group having from 1 to 6 carbons represented by $R^4$ include methyl groups, ethyl groups, propyl groups, butyl groups, pentyl groups and hexyl groups, and examples of the acyl group represented by $R^4$ include acetyl groups, propionyl groups, butyryl groups, and hexanoyl groups.

Examples of the organopolysiloxane having a branched structure of component (B) include straight chain organopolysiloxanes having a partially branched structure, organopolysiloxanes having a dendritic molecular structure, organopolysiloxanes having a star-like branched structure, and organopolysiloxanes having a partially crosslinked structure obtained by crosslinking a plurality of straight chain organopolysiloxanes. The organopolysiloxane having a polyoxyalkylene group of component (B) may be a single organopolysiloxane or a mixture of two or more organopolysiloxanes.

A preferred example of component (B) is an organopolysiloxane having the structure represented by formula 1 below.

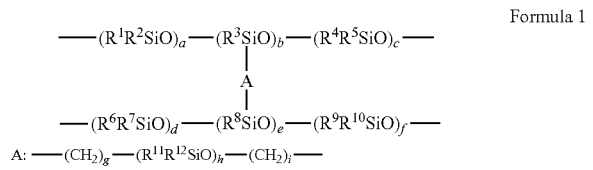

Formula 1

In formula 1 above, the $R^1$ to $R^4$, $R^6$ to $R^9$, $R^{11}$, and $R^{12}$ moieties are each a monovalent hydrocarbon group, preferably an alkyl group or an aryl group, and more preferably a methyl group, the $R^5$ and $R^{10}$ moieties are each represented by $-(CH_2)_jO-(C_2H_4O)_k-(C_3H_6O)_t-(C_4H_8O)m-R^{13}$, and the $R^{13}$ moiety is a hydrogen atom, an alkyl group, an aryl group or an acyl group.

In the formula above, the ranges, preferred ranges and more preferred ranges of the variables that represent the number of units are as follows. a; $1 \le a \le 1000$, preferably $1 \le a \le 500$, and most preferably $1 \le a \le 250$, b; $0 < b \le 30$, preferably $0 < b \le 20$, and most preferably $0 < b \le 15$, c; $1 \le c \le 20$, preferably $1 \le c \le 15$, and most preferably $0 \le c \le 10$, d; $1 \le d \le 1000$, preferably $1 \le d \le 500$, and most preferably $1 \le d \le 250$, e; $0 < e \le 30$, preferably $0 < e \le 20$, and most preferably $0 < e \le 15$, f; $1 \le f \le 20$, preferably $1 \le f \le 15$, and most preferably $0 \le f \le 10$, g; $g \le 3$, h; $1 \le h \le 5000$, preferably $1 \le h \le 2500$, and most preferably $1 \le h \le 1000$, i; $i \le 3$, j; $j \le 3$, k; $0 < k \le 150$, preferably $0 < k \le 100$, and most preferably $0 < k \le 50$, t; $0 < t \le 150$, preferably $0 < t \le 100$, and most preferably $0 < t \le 50$, m; $0 < m \le 150$, preferably $0 < m \le 100$, and most preferably $0 < m \le 500 <$, $(k+t+m) \le 200$.

The production method, reaction conditions, temperature, and the like of the organopolysiloxane having the structure represented by Formula 1 are publicly known and would be obvious to a person skilled in the art, but the target component can be obtained on the basis of the information disclosed in, for example, Japanese Unexamined Patent Application Publication No. H07-185212.

Component (B) is preferably a low viscosity component that is a liquid at 25° C. from the perspectives of dispersibility and workability of the anti-foaming agent of the present invention in harsh environments such as high temperatures or strongly alkaline conditions, and is preferably a highly viscous material from the perspective of anti-foaming properties. Therefore, the viscosity at 25° C., as measured using a B type rotational viscometer (no. 4 rotor, 6 rpm), is preferably from 100 to 1,000,000 mPa·s, and more preferably from 1,000 to 100,000 mPa·s. If the viscosity is less than 100 mPa·s, component (B) separates in the anti-foaming agent and becomes unstable, and if the viscosity exceeds 1,000,000 mPa·s, it can be difficult to produce an emulsion of the anti-foaming agent.

Component (B) is preferably contained at a quantity of from 1 to 40 wt. %, more preferably from 3 to 35 wt. %, further preferably from 5 to 30 wt. %, even more preferably from 8 to 25 wt. %, and particularly preferably from 10 to 20 wt. %, relative to the total weight of the anti-foaming agent.

Component (C) is not particularly limited as long as the component is an anionic surfactant. One or two or more anionic surfactants may be used. Examples of component (C) include saturated or unsaturated higher fatty acid salts (for example, sodium stearate and the like), α-sulfo fatty acid alkyl ester salts, α-olefin sulfonic acid salts, alkane sulfonic acid salts, straight chain alkylbenzene sulfonic acids and salts thereof, polyoxyalkylene alkyl ether sulfonic acid salts, polyoxyalkylene alkenyl ether sulfonic acid salts, polyoxyethylene alkylsulfonic acid ester salts, sulfosuccinic acid alkyl ester salts, polyoxyalkylene sulfosuccinic acid salts, polyoxyalkylene alkyl ether acetic acid salts, α-olefin phosphoric acid salts, polyoxyalkylene alkyl ether phosphoric acid salts, acylglutamic acid salts, alkyloylalkyl taurine salts, N-acylamino acid salts, alkyl alkyl ether carboxylic acid salts, alanine derivatives, glycine derivatives, arginine derivatives, and mixtures thereof. Of these, sulfonic acid salt-based anionic surfactants selected from among α-sulfo fatty acid alkyl ester salts, α-olefin sulfonic acid salts, alkane sulfonic acid salts, straight chain alkylbenzene sulfonic acid salts, and mixtures thereof are preferred.

By using component (C), it is possible to provide an anti-foaming agent which suppresses the generation of undesirable aggregates even in harsh environments such as high temperatures or strongly alkaline conditions, which occur in, for example, pulp production processes, and which exhibits high dispersion stability.

Examples of the aforementioned sulfonic acid salts include sodium salts, potassium salts, lithium salts, and ammonium salts. Sodium salts are particularly preferred.

α-sulfo fatty acid alkyl ester salts are not particularly limited, but examples thereof include a sodium salt of a 2-sulfotetradecanoic acid 1-methyl ester and a sodium salt of a 2-sulfohexadecanoic acid 1-methyl ester.

α-olefin sulfonic acid salts are not particularly limited, but examples thereof include α-olefin sulfonic acid salts having from 14 to 19 carbons, and a specific example thereof is sodium tetradecene sulfonate. Moreover, hydroxyalkyl sulfonic acid salts having from 14 to 19 carbons may be contained as by-products. Specifically, a mixture of sodium tetradecene sulfonate and sodium hydroxy tetradecane sulfonate may be contained.

Alkane sulfonic acid salts are not particularly limited, but examples thereof include sodium alkane sulfonates having from 14 to 18 carbons, and specific examples thereof include sodium lauryl sulfate, sodium hexadecyl sulfate, and sodium stearyl sulfate.

Straight chain alkylbenzene sulfonic acid salts are not particularly limited, but examples thereof include straight chain sodium alkylbenzene sulfonates having from 6 to 14 carbons, and specific examples thereof include sodium decylbenzene sulfate, sodium undecylbenzene sulfate, sodium dodecylbenzene sulfate, sodium tridecylbenzene sulfate, and sodium tetradecylbenzene sulfate.

Component (C) is preferably contained at a quantity of from 1 to 30 wt. %, more preferably from 2 to 25 wt. %, further preferably from 3 to 20 wt. %, even more preferably from 5 to 17.5 wt. %, and particularly preferably from 7 to 15 wt. %, relative to the total weight of the anti-foaming agent.

In some cases, the anti-foaming agent of the present invention further contains (D) a non-ionic surfactant (excluding component (B)). One or two or more non-ionic surfactants may be used.

When used in combination with component (B), component (D) has the effect of further improving the stability of the anti-foaming agent as an emulsion. In cases where the anti-foaming agent of the present invention is stored as an emulsion, it is preferable to blend component (D).

In one mode, component (D) is not particularly limited, but examples thereof include glycerin fatty acid esters, polyglycerol fatty acid esters, sorbitan fatty acid esters, propylene glycol fatty acid esters, sucrose fatty acid esters, polyoxyalkylene alkyl ethers such as polyoxyethylene alkyl ethers and polyoxypropylene alkyl ethers, polyoxyalkylene alkyl phenyl ethers, polyoxyalkylene glycerin fatty acid esters such as polyoxyalkylene sorbitan fatty acid esters and polyoxyethylene fatty acid esters, and polyoxyethylene-polyoxypropylene copolymer type non-ionic emulsifiers. Here, alkyl groups can have, for example, from 1 to 30 carbons, examples of which include higher alkyl groups (for example, alkyl groups having from 10 to 21 carbons, or more) such as decyl groups, undecyl groups, dodecyl groups, tridecyl groups, tetradecyl groups, cetyl groups, and stearyl groups. In addition, examples of fatty acids include fatty acids having more than 10 carbons, for example, higher/medium fatty acids (for example, fatty acids having from 12 to 18 carbons, or more) such as lauric acid, palmitic acid, stearic acid and oleic acid.

Component (D) is preferably a polyoxyethylene alkyl ether, a polyoxyethylene-polyoxypropylene copolymer type non-ionic emulsifier, or a mixture thereof.

Component (D) is contained at a quantity of, for example, from 0.01 to 25 wt. %, preferably from 0.01 to 20 wt. %, more preferably from 0.1 to 15 wt. %, and particularly preferably from 0.1 to 10 wt. %, relative to the total weight of the anti-foaming agent.

Furthermore, the anti-foaming agent of the present invention may also contain a water-soluble polymer in order to improve the dispersibility of the other components and improve workability when preparing the anti-foaming agent.

This type of water-soluble polymer can be a publicly known material and is not particularly limited, but examples thereof include xanthan gum, gum arabic, guar gum, starch, methyl cellulose, ethyl cellulose, carboxymethyl cellulose, hydroxyethyl cellulose, carboxymethyl cellulose salts, poly(vinyl alcohol), glycol salts of cellulose, alginic acid salts, poly((meth)acrylic acid salts, and long chain alkyl-modified poly((meth)acrylic acid salts.

The aforementioned water-soluble polymer is contained at a quantity of, for example, from 0.05 to 20 wt. %, preferably from 0.1 to 10 wt. %, and more preferably from 0.5 to 5 wt. %, relative to the total weight of the anti-foaming agent. If the content of the water-soluble polymer is too low, the stability of the anti-foaming agent may deteriorate, but if the content of the water-soluble polymer is too high, the viscosity of the anti-foaming agent increases and it can be difficult to handle the anti-foaming agent.

In order to improve retention of anti-foaming properties, high temperature characteristics, and dilution stability, the anti-foaming agent of the present invention may further contain an inorganic ammonium salt, an organosilicon compound, a (poly)siloxane resin, a polyoxyalkylene-polysiloxane copolymer, and the like. The mode, reaction conditions, temperature, and the like are publicly known and would be obvious to a person skilled in the art, but it is possible to use the information disclosed in, for example, Japanese Examined Patent Application Publication No. H04-42043 and Japanese Unexamined Patent Application Publication Nos. H05-261206 and H05-261207.

The aforementioned polysiloxane resin is not particularly limited, but may be a polymer of a siloxane resin which essentially comprises $(CH_3)_3SiO_{1/2}$ units and $SiO_2$ units and in which the ratio of $(CH_3)_3SiO_{1/2}$ units relative to $SiO_{1/2}$ units is from 0.4/1 to 1.2/1. The production method, reaction conditions, temperature, and the like of the aforementioned polysiloxane resin are publicly known and would be obvious to a person skilled in the art, but it is possible to use the information disclosed in, for example, Japanese Unexamined Patent Application Publication Nos. S60-251906, H05-184814, and S63-147507.

The aforementioned polyoxyalkylene-polysiloxane copolymer is not particularly limited, but it is possible to use a modified silicone oil which has (1) at least one silicon atom-bonded functional organic group, which has at least one functional group selected from the group consisting of epoxy groups, amino groups, amide groups, carboxyl groups, alkoxy groups, and hydroxyl groups, in the molecule and which has (2) at least one substituted or unsubstituted polyoxyalkylene group to which a silicon atom is bonded. The production method, reaction conditions, temperature, and the like of the aforementioned polyoxyalkylene-polysiloxane copolymer are publicly known and would be obvious to a person skilled in the art, but it is possible to use the information disclosed in, for example, Japanese Unexamined Patent Application Publication No. H03-151004.

In cases where the anti-foaming agent contains the aforementioned polysiloxane resin and/or the aforementioned polyoxyalkylene-polysiloxane copolymer, the method for producing the anti-foaming agent is not particularly limited, but it is possible to use the methods disclosed in, for example, Japanese Examined Patent Application Publication No. S45-23613, Japanese Unexamined Patent Application Publication No. S60-251906, Japanese Examined Patent Application Publication No. S52-19836, and Japanese Unexamined Patent Application Publication Nos. S63-147507 and H03-151004. The production method, reaction conditions, temperature, and the like of these methods are publicly known and would be obvious to a person skilled in the art, but the target component can be obtained on the basis of the information disclosed in the above-mentioned documents.

The anti-foaming agent of the present invention can be produced by mixing at least components (A) to (C). The method of mixing is not particularly limited, and it is possible to mix all the components separately or to combine some of the components in advance, but mixing all the components at once is simple in terms of producing the anti-foaming agent as a one part preparation, and is therefore preferred. In addition, in view of dispersion efficiency of the anti-foaming agent following addition, it is possible to use the anti-foaming agent as a one part preparation after dilution with a suitable organic solvent or water.

The anti-foaming agent of the present invention may be an emulsion type anti-foaming agent obtained by dispersing the components in water, and the preparation method of such an emulsion is not particularly limited. For example, it is possible to add a mixture of components (A) to (C) and, if necessary, component (D) to an aqueous solution in which a thickening agent comprising a water-soluble polymer is dispersed, and then homogeneously mix the components. This mixing can be carried out by using a stirring/mixing device/apparatus such as a homomixer, a universal mixer, an ultramixer, a planetary mixer, a blade type mixer, a dissolver, a ball mill, a sand mill, an ultrasonic disperser, a kneader, a line mixer, or a combi mixer, and it is possible to use a combination of two or more of these devices/apparatuses. Moreover, during the mixing, the mixture may be heated to a temperature of, for example, from 40 to 150° C., In cases where the anti-foaming agent of the present invention is formed as an emulsion, it is possible to use any of the following methods:
(i) Stirring and mixing component (A), component (C) and, if necessary, component (D), stirring and mixing component (B), adding water, and then stirring and mixing so as to effect emulsification,
(ii) Stirring and mixing component (A) and component (B), adding component (C), water and, if necessary, component (D), and then stirring and mixing so as to effect emulsification,
(iii) Stirring and mixing components (A) to (C) and, if necessary, component (D), adding water, and then stirring and mixing so as to effect emulsification, or
(iv) Stirring and mixing all the components, including water, at once so as to effect emulsification.
Method (iv) is preferred.

Water, which may be contained in the anti-foaming agent of the present invention, is used in order to increase dispersibility in water-based foaming liquids and improve initial defoaming properties, and also has the effect of reducing flammability and improving safety during handling. The water used can be distilled water, ion exchanged water, tap water, industrial water, well water, river water, spring water, and the like.

The water may be contained at a quantity of from 0 to 90 wt. %, preferably from 10 to 60 wt. %, and more preferably from 20 to 50 wt. %, relative to the total weight of the anti-foaming agent. In cases where the anti-foaming agent of the present invention is dispersed as an emulsion in water, if the content of water is too low, dispersibility may be insufficient and it can be difficult to improve the initial defoaming properties, but if the content of water is too high, the content of the other components contained in the anti-foaming agent of the present invention is relatively low, meaning that anti-foaming performance can deteriorate. However, a person skilled in the art can select an appropriate content of water according to the mode of use and intended use of the anti-foaming agent.

Furthermore, the anti-foaming agent of the present invention may, if necessary, contain higher fatty acids and ester compounds thereof, amide compounds, mineral oils, water, bases, acids, and the like. In addition, the anti-foaming agent of the present invention may, if necessary, contain stabilizers such as germicides, preservatives, fungicides, and corrosion inhibitors. For example, it is possible to use sodium hypochlorite, sorbic acid, and the like as a germicide, and the added quantity thereof can be, for example, from 0.05 to 5 wt. % relative to the total weight of the anti-foaming agent. These additional components can be selected as appropriate by a person skilled in the art.

The present invention also relates to a pulp production method characterized by adding the above-mentioned anti-foaming agent to water used in a pulp production process.

The anti-foaming agent of the present invention can be mainly used in steps in a pulp production process in which foaming occurs, such as a digestion step, a washing step, a bleaching step, and processing step. In the above-mentioned pulp production process, the water contains black liquor in the washing step and the bleaching step, meaning that foaming readily occurs, and the anti-foaming agent of the present invention is therefore useful in these steps.

The anti-foaming agent of the present invention can be added to water that resides or circulates in, for example, the vacuum drum washer vat, the filtrate tank, the piping between the vacuum drum washer and the filtrate tank, piping between the filtrate tank and the vacuum drum washer, a scattering pipe in the vacuum drum washer or a repulper in the washing step. In addition, the anti-foaming agent of the present invention can be added to water in, for example, the vacuum drum washer vat or the filtrate tank in the bleaching step.

The added quantity of the anti-foaming agent of the present invention is generally a total concentration of from 1 to 500 g/ton, and preferably from 10 to 200 g/ton, relative to the weight of absolutely dry pulp, but can be altered according to the temperature, pH, and quantity of the water to which the anti-foaming agent is added, the type and quantity of effervescent substance, the type, addition method, and addition location of wood chips, the performance of the apparatus, and the like. However, a person skilled in the art could determine an optimal concentration as appropriate. For example, an added quantity of less than 1 g/ton is not preferable due to concerns that a satisfactory anti-foaming effect cannot be achieved. In addition, an added quantity in excess of, for example, 500 g/ton is not preferable due to concerns regarding a deterioration in dewatering efficiency is subsequent steps.

The addition method of the anti-foaming agent of the present invention can be any method such as continuous addition, intermittent addition, or addition achieved by operating a foam measurement device in conjunction with an anti-foaming agent addition device, that is, addition whereby the added quantity is determined on the basis of foam measurement results. In addition, one or more addition locations may be used. The anti-foaming agent of the present invention may additionally contain another publicly known anti-foaming agent as long as the objective of the present invention is not impaired, and the anti-foaming agent may be diluted with an appropriate solvent or water when added.

In the present specification, the term "high temperature" means from 60 to 80° C., but may also be a temperature in excess of 80° C., such as 81° C., 82° C., 83° C., 84° C., 85° C., 86° C., 87° C., 88° C., 89° C., 90° C., or 100° C. or higher. In addition, the term "strongly alkaline" means a pH of 12 or higher, but can also be a pH of less than 12, such as 11.5, 11, 10.5, 10, 9.5, or 9.0 or higher.

In the present specification, it can be understood that all numerical values used to indicate the content or content range of a component, unless explicitly indicated otherwise, may encompass the meaning of the term "approximately". For example, unless explicitly indicated otherwise, "10 wt. %" means "approximately 10 wt. %", that is, practically 10 wt. %.

All the disclosures in the prior art documents cited in the present specification should be regarded as being incorporated in the present specification, and it is understood that a person skilled in the art would incorporate relevant matters disclosed in these prior art documents as a part of the present specification in accordance with the context of the present specification without deviating from the gist and scope of the present invention.

The anti-foaming agent of the present invention can be used not only in the paper pulp industry, but also in an anti-foaming agent used to suppress foaming in process water or waste water in a variety of manufacturing industries, such as the petrochemical industry, the textile industry, and the paint industry, and waste water treatment processes such as municipal sewerage/excrement treatment plants.

That is, the anti-foaming agent of the present invention exhibits excellent performance in high temperature and strongly alkaline conditions, and can therefore be used as an additive for degumming processes, bleaching processes, and dyeing processes in the textile industry, synthetic resins, emulsion polymerization in the rubber industry, or as an additive for a variety of sizing agents, water-based paints, and cleaning agents.

EXAMPLES

In order to embody the present invention, practical examples will now be given. However, it should be understood that these practical examples do not limit the scope of the present invention.

Preparation of Silicone-Based Anti-Foaming Agent 1

The silicone-based anti-foaming agent disclosed in practical example 4 in Japanese Unexamined Patent Application Publication No. S63-147507 was prepared. Specifically, 378 g of a polydimethylsiloxane capped at molecular terminals with trimethylsilyl groups (viscosity at 25° C.: 1,000 cs), 180 g of a polydimethyl siloxane capped at molecular terminals with silanol groups (viscosity at 25° C.: 12,500 cs), and 18 g of a poly(ethyl silicate) ("Silicate 45" produced by Tama Chemicals Co., Ltd.) were placed in a 1 liter three-necked flask equipped with a stirrer, a thermometer, and nitrogen gas introduction/discharge means, and heated under stirring. 3 g of a catalyst (which was obtained in advance by reacting 10 g of KOH and 90 g of a polydimethyl siloxane capped at molecular terminals with trimethylsilyl groups and having a viscosity at 25° C. of 1,000 cs for 15 minutes at 120° C.) was added at a temperature of 130 to 140° C., was added to the flask, and the stirring and heating were continued. Next, 18 g of silica ("Aerosil 200" produced by Nippon Aerosil, specific surface area: 200 $m^2$/g) and 30 g of a polydimethyl siloxane capped at molecular terminals with silanol groups (viscosity at 25° C.: 400 cs) were added and homogeneously dispersed using a homomixer. The mixture was then allowed to react for 4 hours at 180° C. under stirring. The obtained reaction product was heated for 1 hour at 180° C. under reduced pressure at 40 mm Hg, unreacted products and reaction by-products were removed, and the reaction product was then allowed to cool to room temperature, thereby obtaining a viscous pale yellow silicone-based anti-foaming agent (hereinafter, referred to as "composition A"). Moreover, nitrogen purging was carried out in each step.

Furthermore, 500 g of composition A and a polyoxyalkylene-modified silicone represented by the formula: $(Me_3SiO_{1/2})_2(Me_2SiO_{2/2})_{75}(MeXSiO_{2/2})_7$ (in the formula, Me denotes a methyl group, and X denotes a polyoxyalkylene group represented by $—C_3H_6—O—(C_2H_4O)_{13}(C_3H_6O)_{11}—H$) at a quantity corresponding to 0.5 parts by weight relative to 100 parts by weight of composition A were placed in a separately prepared 1 liter three-necked flask, after which, 1.5 g of the same catalyst as that mentioned above (that is, a catalyst obtained in advance by reacting 10 g of KOH and 90 g of a polydimethyl siloxane capped at molecular terminals with trimethylsilyl groups and having a viscosity at 25° C. of 1,000 cs for 15 minutes at 120° C.) was placed in the flask and homogeneously dispersed using a homomixer. The mixture was then heated under stirring and allowed to react for 1 hour at 180° C. under stirring. The reaction product was then allowed to cool to room temperature, thereby obtaining a viscous pale yellow silicone-based anti-foaming agent. The obtained silicone-based anti-foaming agent had a viscosity at 25° C. of 20,000 mPa·s (using a B type rotational viscometer with a no. 4 rotor at 6 rpm). Moreover, nitrogen purging was carried out in each step.

Preparation of Crosslinked Polyoxyalkylene-Modified Polyorganosiloxane

A crosslinked polyoxyalkylene-modified polyorganosiloxane was prepared according to the disclosures in Japanese Unexamined Patent Application Publication No. H07-185212. Specifically, 65.9 g of a dimethylsiloxane-methyl hydrogen siloxane copolymer capped at both molecular terminals with trimethylsilyl groups and having a viscosity at 25° C. of 135 mPa·s (silicon-bonded hydrogen atom content: 0.12 wt. %) and 21.7 g of a polydimethyl siloxane capped at both molecular terminals with dimethylvinylsilyl groups and having a viscosity at 25° C. of 360 mPa·s were homogeneously mixed in a reaction vessel at 20° C., 0.47 g of a 2 wt. % isopropanol solution of chloroplatinic acid was added to the mixture, and the mixed solution was heated to 60° C. Next, 90 g of isopropanol and 212.3 g of a polyoxyalkylene represented by the formula: $CH_2=CH—CH_2—O—(C_2H_4O)_{20}—(C_3H_6O)_{20}—H$ were introduced, and the isopropanol was refluxed for 60 minutes at 80° C. The isopropanol was then removed from the obtained mixed reaction solution at 130° C. under reduced pressure at 25 mm Hg, and the mixed reaction solution was then cooled, thereby obtaining a crosslinked polyoxyalkylene-modified polyorganosiloxane having a viscosity at 25° C. of 20,000 mPa·s (using a B type rotational viscometer with a no. 4 rotor at 6 rpm).

Practical Examples 1 to 4 and Comparative Examples 1 to 4

The components were homogeneously mixed at the compositions disclosed in Table 1 and Table 2 (the numbers in the tables are wt. %), thereby preparing the emulsion type anti-foaming agent of Practical Examples 1 to 4 and Comparative Examples 1 to 4. The obtained anti-foaming agents were evaluated in terms of quantity of deposits (aggregates) generated and emulsion stability, as described below. Results are shown in Tables 1 and 2.

Method for Measuring Quantity of Deposits Generated 2 g of each of the anti-foaming agent of Practical Examples 1 to 4 and Comparative Examples 1 to 4 was placed in 100 g of a diluted black liquor obtained by diluting a black liquor having a solid content of 12.8 wt. % 10 times with ion exchanged water, mixed, and left for 4 days in an oven at 80° C. The mixture was removed from the oven, allowed to cool, filtered with a 120 mesh stainless steel wire mesh, the weight of which was measured in advance, and deposits caught by the stainless steel wire mesh were dried for 30 minutes at 150° C. The quantity of deposits generated was determined using the formula below. Moreover, content of active components means the content (wt. %) of components other than water and thickening agent in the anti-foaming agent.

Quantity of deposits generated (wt. %)=[(weight (g) of dry deposits+weight (g) of stainless steel wire mesh)−weight (g) of stainless steel wire mesh]/(quantity of anti-foaming agent introduced (2 g)×content of active components (wt. %))

TABLE 1

|  | Practical Example 1 | Practical Example 2 | Practical Example 3 | Practical Example 4 |
|---|---|---|---|---|
| Silicone-based anti-foaming agent 1 | 16.20% | 16.20% | 16.20% | 16.20% |
| Crosslinked polyoxyalkylene-modified polyorganosiloxane | 5.40% | 5.40% | 5.40% | 5.40% |
| Polyoxyalkylene-modified polyorganosiloxane[1] | — | — | — | — |
| Polyoxyethylene-polyoxypropylene copolymer[2] | 5.40% | 5.40% | 5.40% | 5.40% |
| Sodium lauryl sulfate[3] | 10.00% | — | 10.00% | — |
| Sodium dodecyl benzene sulfonate[4] | — | 4.62% | — | 4.62% |
| Polyoxyethylene stearyl ether (EO2)[5] | — | — | 3.00% | 3.00% |
| Polyoxyethylene stearyl ether (EO20)[6] | — | — | — | — |
| Thickening agent[7] | 25.00% | 25.00% | 25.00% | 25.00% |
| Ion exchange water | 38.00% | 43.38% | 35.00% | 40.38% |
| Content of active components | 30.25% | 30.25% | 33.25% | 33.25% |
| Quantity of deposits generated | 10.9% | 4.9% | 2.7% | 2.4% |

TABLE 2

|  | Comparative Example 1 | Comparative Example 2 | Comparative Example 3 | Comparative Example 4 |
|---|---|---|---|---|
| Silicone-based anti-foaming agent 1 | 16.20% | 16.20% | 16.20% | 16.20% |
| Crosslinked polyoxyalkylene-modified polyorganosiloxane | 5.40% | — | — | — |
| Polyoxyalkylene-modified polyorganosiloxane[1] | — | 5.40% | 5.40% | 5.40% |
| Polyoxyethylene-polyoxypropylene copolymer[2] | 5.40% | 5.40% | 5.40% | 5.40% |
| Sodium lauryl sulfate[3] | — | 10.00% | — | 10.00% |
| Sodium dodecyl benzene sulfonate[4] | — | — | 4.62% | — |
| Polyoxyethylene stearyl ether (EO2)[5] | 3.00% | 3.00% | 3.00% | 3.00% |
| Polyoxyethylene stearyl ether (EO20)[6] | 3.00% | — | — | 3.00% |
| Thickening agent[7] | 25.00% | 25.00% | 25.00% | 25.00% |
| Ion exchange water | 42.00% | 35.00% | 40.38% | 32.00% |
| Content of active components | 33.25% | 33.25% | 33.25% | 36.25% |
| Quantity of deposits generated | 39.6% | 36.7% | 30.8% | 43.2% |

[1] Average unit formula: $(Me_3SiO_{1/2})_2(Me_2SiO_{2/2})_{108}(MeXSiO_{2/2})_{10}$ (in the formula, Me denotes a methyl group, and X is a polyoxyalkylene group represented by $-C_3H_6-O-(C_2H_5O)_{20}(C_3H_6O)_{20}-H$)
[2] Degree of EO (ethylene oxide) polymerization: 10, degree of PO (propylene oxide) polymerization: 30
[3] 30% aqueous solution
[4] 65% aqueous solution
[5] Degree of EO (ethylene oxide) polymerization: 2
[6] Degree of EO (ethylene oxide) polymerization: 20
[7] 1% aqueous solution of xanthan gum (produced by CP Kelco)

As is clear from Table 1 and Table 2, the anti-foaming agents of Practical Examples 1 to 4 have a lower quantity of generated deposits than the anti-foaming agents of Comparative Examples 1 to 4. Using a combination of a polyoxyalkylene group-containing branched chain organopolysiloxane (a crosslinked polyoxyalkylene-modified polyorganosiloxane) and an anionic surfactant reduces the quantity of deposits generated compared to a case in which a polyoxyalkylene group-containing branched chain organopolysiloxane and a non-ionic surfactant are used (see Practical Examples 1 to 4 and Comparative Example 1). Using a combination of a polyoxyalkylene group-containing branched chain organopolysiloxane and an anionic surfactant reduces the quantity of deposits generated compared to cases in which a polyoxyalkylene group-containing straight chain organopolysiloxane (polyoxyalkylene-modified polyorganosiloxane[1]) and an anionic surfactant are used (see Practical Examples 1 to 4 and Comparative Examples 2 to 4). In addition, using a combination of a polyoxyalkylene group-containing branched chain organopolysiloxane, an anionic surfactant, and a non-ionic surfactant (polyoxyethylene stearyl ether) further reduces the quantity of deposits generated (see Practical Examples 3 to 4).

The invention claimed is:

1. A pulp production method comprising adding an anti-foaming agent to water comprising pulp for pulp production, the anti-foaming agent comprising:
    (A) an organopolysiloxane and a finely powdered inorganic filler;
    (B) a polyoxyalkylene group-containing branched chain organopolysiloxane; and
    (C) an anionic surfactant.

2. The production method according to claim 1, wherein the anti-foaming agent is added at a total concentration of from 1 to 500 g/ton relative to the weight of absolutely dry pulp.

3. The production method according to claim 1, wherein the anti-foaming agent is added to the water comprising pulp for pulp production in a pulp washing step and/or a pulp bleaching step.

4. The production method according to claim 1, wherein the finely powdered inorganic filler is selected from microparticulate silica, titanium dioxide, aluminum oxide, fumed $TiO_2$, $Al_2O_3$, zinc oxide, magnesium oxide, and mixtures thereof.

5. The production method according to claim 1, wherein a blending quantity of the (A) organopolysiloxane and finely powdered inorganic filler is from 5 to 90 wt. % relative to the total weight of the anti-foaming agent.

6. The production method according to claim 1, wherein a blending quantity of the (B) polyoxyalkylene group-containing branched chain organopolysiloxane is from 1 to 40 wt. % relative to the total weight of the anti-foaming agent.

7. The production method according to claim 1, wherein the (C) anionic surfactant is a sulfonate type anionic surfactant selected from α-sulfo fatty acid alkyl ester salts, α-olefin sulfonate salts, alkane sulfonic acid salts, straight chain alkylbenzene sulfonate salts, and mixtures thereof.

8. The production method according to claim 7, wherein the sulfonate salts are selected from sodium salts, potassium salts, lithium salts, ammonium salts, and mixtures thereof.

9. The production method according to claim 1, wherein a blending quantity of the (C) anionic surfactant is from 1 to 30 wt. % relative to the total weight of the anti-foaming agent.

10. The production method according to claim 1, wherein the anti-foaming agent further comprises (D) a non-ionic surfactant other than component (B).

11. The production method according to claim 10, wherein a blending quantity of the (D) non-ionic surfactant excluding component (B) is from 0.01 to 25 wt. % relative to the total weight of the anti-foaming agent.

12. The production method according to claim 1, wherein the anti-foaming agent further comprises (E) a water-soluble polymer.

13. The production method according to claim 1, wherein the anti-foaming agent further comprises water and is in the form of an emulsion.

14. The production method according to claim 1, wherein the anti-foaming agent exhibits stable anti-foaming performance at a temperature from 60 to 80° C. or in excess of 80° C.

15. The production method according to claim 1, wherein the anti-foaming agent exhibits stable anti-foaming performance at a pH of 9.0 or higher.

* * * * *